United States Patent
Wang et al.

(10) Patent No.: US 12,210,647 B2
(45) Date of Patent: Jan. 28, 2025

(54) ADDITIVE AND SUBTRACTIVE NOISE FOR PRIVACY PROTECTION

(71) Applicant: Google LLC, Mountain View, CA (US)

(72) Inventors: Gang Wang, Jersey City, NJ (US); Andres Munoz Medina, Brooklyn, NY (US); Marcel M. Moti Yung, New York, NY (US); Yijian Bai, San Ramon, CA (US); Ardian Poernomo, Santa Clara, CA (US); Jingjing Wang, Redwood City, CA (US)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 17/794,040

(22) PCT Filed: Apr. 20, 2021

(86) PCT No.: PCT/US2021/028170
§ 371 (c)(1),
(2) Date: Jul. 20, 2022

(87) PCT Pub. No.: WO2022/071994
PCT Pub. Date: Apr. 7, 2022

(65) Prior Publication Data
US 2023/0052628 A1    Feb. 16, 2023

(30) Foreign Application Priority Data
Sep. 29, 2020    (IL) .......................................... 277642

(51) Int. Cl.
*G06F 21/62*    (2013.01)
(52) U.S. Cl.
CPC ................................ *G06F 21/6245* (2013.01)
(58) Field of Classification Search
None
See application file for complete search history.

(56) References Cited

U.S. PATENT DOCUMENTS

| | | |
|---|---|---|
| 2014/0223575 A1 | 8/2014 | Nandi et al. |
| 2015/0135329 A1* | 5/2015 | Aghasaryan ........ H04L 63/0421 726/26 |

(Continued)

FOREIGN PATENT DOCUMENTS

| | | |
|---|---|---|
| JP | 2014-522009 | 8/2014 |
| KR | 10-2014-0006063 | 1/2014 |

(Continued)

OTHER PUBLICATIONS

Benjamin Savage, "Support for Advertising Use Cases" submitted on Apr. 14, 2020, retrieved on Oct. 17, 20222, <https://github.com/w3c/web-advertising/blob/main/support_for_advertising_use_cases.md#frequency-optimization>, 44 pages.

(Continued)

*Primary Examiner* — Syed A Roni
(74) *Attorney, Agent, or Firm* — Fish & Richardson P.C.

(57) ABSTRACT

Methods, systems, and apparatus, including computer programs encoded on a computer storage medium, for using additive and subtractive noise for preserving the privacy of users. In one aspect, a method includes obtaining a first set of genuine user group identifiers that identify user groups that include a user as a member. A second set of user group identifiers is generated for the user by removing zero or more genuine user group identifiers from the first set to generate the second set and adding, to the second set, one or more fake user group identifiers for user groups that do not include the user as a member. A probabilistic data structure is generated based on the second set of user group identifiers. The probabilistic data structure is transmitted. Data indicating a set of digital components including at least one digital component selected based on the probabilistic data structure is received.

19 Claims, 5 Drawing Sheets

(56) References Cited

U.S. PATENT DOCUMENTS

| | | |
|---|---|---|
| 2016/0371729 A1 | 12/2016 | Glover et al. |
| 2017/0017973 A1 | 1/2017 | Cochrane et al. |
| 2017/0091824 A1 | 3/2017 | Leith et al. |

FOREIGN PATENT DOCUMENTS

| | | |
|---|---|---|
| KR | 10-1544460 | 8/2015 |
| KR | 10-2019-0102308 | 9/2019 |
| WO | WO 2018034192 | 2/2018 |

OTHER PUBLICATIONS

Charlie Harrison, "Aggregated Reporting API" submitted on Sep. 17, 2020, <https://github.com/csharrison/aggregate-reporting-api>, 6 pages.

Charlie Harrison, "Attribution Reporting API" submitted on May 22, 2019, <https://github.com/WICG/attribution-reporting-api>, 4 pages.

International Search Report and Written Opinion in International Appln. No. PCT/US2021/028170, dated Jul. 5, 2021, 16 pages.

Michael Kleber, "PIGIN" submitted on Jan. 16, 2020, <https://github.com/michaelkleber/pigin>, 8 pages.

Michael Kleber, "Turtle Dove" submitted on Jan. 16, 2020, <https://github.com/WICG/turtledove>, 2 pages.

Nandi et al., "On the use of decentralization to enable privacy in web-scale recommendation services." Proceedings of the 12th ACM workshop on Workshop on privacy in the electronic society, Nov. 2013, 25-36.

Wikipedia.org [online], "Bloom filter" May 17, 2020, retrieved on May 26, 2020, retrieved from URL <https://en.wikipedia.org/wiki/Bloom_filter>, 22 pages.

Wikipedia.org [online], "Differential Privacy" May 15, 2020, retrieved on May 26, 2020, <https://en.wikipedia.org/w/index.php?title=Differential_privacy&oldid=956739583>, 11 pages.

Wikipedia.org [online], "HMAC" May 6, 2020, retrieved on May 26, 2020, retrieved from URL <https://en.wikipedia.org/w/index.php?title=HMAC&oldid=955119550>, 6 pages.

Office Action in Israel Appln. No. 277642, mailed on May 30, 2023, 4 pages.

International Preliminary Report on Patentability in International Appln. No. PCT/US2021/028170, mailed on Apr. 13, 2023, 9 pages.

Office Action in Indian Appln. No. 202227032803, mailed on Aug. 30, 2023, 7 pages (with English translation).

Office Action in Japanese Appln. No. 2022-541675, Oct. 10, 2023, 8 pages (with English translation).

Notice of Allowance in Japanese Appln. No. 2022-541675, mailed on Feb. 5, 2024, 5 pages (with English translation).

Office Action in Korean Appln. No. 10-2022-7022122, mailed on Apr. 23, 2024, 16 pages (with English translation).

\* cited by examiner

ADDITIVE AND SUBTRACTIVE NOISE FOR PRIVACY PROTECTION

CROSS REFERENCE TO RELATED APPLICATIONS

This application is a National Stage Application under 35 U.S.C. § 371 and claims the benefit of International Application No. PCT/US2021/028170, filed Apr. 20, 2021, which claims priority to IL Application No. 277642, filed Sep. 29, 2020. The disclosures of the foregoing applications are hereby incorporated by reference in their entirety.

BACKGROUND

This specification generally relates to data processing and using additive and subtractive noise for preserving the privacy of users when analyzing user data for the purposes of improving user experience.

Differential privacy underpins many privacy protection efforts and has become popular in recent years because it offers many theoretical guarantees. In general, differential privacy involves techniques for sharing useful information about datasets while protecting the privacy of individuals within the dataset.

SUMMARY

This specification describes technologies relating to preserving user privacy to when analyzing user data for the purposes of improving user experience. In general, one innovative aspect of the subject matter described in this specification can be embodied in methods that include obtaining a first set of genuine user group identifiers that identify user groups that include a user as a member. Based on the first set of genuine user group identifiers, a second set of user group identifiers is generated for the user. The generating includes removing zero or more genuine user group identifiers from the first set of user group identifiers to generate the second set of user group identifiers. One or more fake user group identifiers for user groups that do not include the user as a member is added to the second set of user group identifiers. A probabilistic data structure is generated based on the second set of user group identifiers. The probabilistic data structure is transmitted to a recipient computing system. Data indicating a set of digital components comprising at least one digital component selected based on the probabilistic data structure is received. A given digital component is selected from the set of digital components. The given digital component is presented. Other implementations of this aspect include corresponding apparatus, systems, and computer programs, configured to perform the aspects of the methods, encoded on computer storage devices.

These and other implementations can each optionally include one or more of the following features. In some aspects, removing zero or more genuine user group identifiers from the first set of user group identifiers includes removing multiple genuine user group identifiers from the first set of user group identifiers. In some aspects, the set of digital components includes one or more additional digital components that are not selected based on the probabilistic data structure.

In some aspects, selecting a given digital component from the set of digital components includes generating a filtered subset of digital components, by filtering, from the set of digital components, one or more digital components that do not have a corresponding user group identifier that matches one of the genuine user identifiers and selecting the given digital component from the filtered subset of digital components.

In some aspects, filtering one or more digital components from the set of digital components that do not have a corresponding user group identifier that matches one of the genuine user group identifiers can include identifying, in the data indicating the set of digital components, one or more corresponding user group identifiers for the digital component, each corresponding user identifier being a user group identifier used to select the digital component for inclusion in the set of digital components. Some aspects can include comparing each corresponding user identifier to the genuine user group identifiers in the first set of user group identifiers and removing, from the set of digital components, each digital component that does not have a corresponding user group identifier that matches one of the genuine user group identifiers in the first set of user group identifiers.

In some aspects, the data indicating the set of digital components includes data identifying first digital components that each have one or more corresponding user group identifiers and data identifying one or more second digital components that do not have any corresponding user group identifiers. Selecting a given digital component from the set of digital components can include removing, from the set of digital components, each first digital component for which none of the corresponding user group identifiers for the first digital component matches a genuine user group identifier.

In some aspects, selecting a given digital component from the set of digital components includes selecting a second digital component when all of the first digital components are removed from the set of digital components.

In some aspects, the recipient computing system selects a subset of user groups from multiple user groups based on the probabilistic data structure and selects the set of digital components corresponding to the subset of user groups. In some aspects, the probabilistic data structure includes a Bloom filter or a Cuckoo filter.

In some aspects, removing one or more genuine user group identifiers from the first set of user group identifiers includes selecting the one or more genuine user group identifiers randomly or pseudo-randomly and adding, to the second set of group identifiers, one or more fake user group identifiers include selecting the one or more fake user group identifiers randomly or pseudo-randomly.

In some aspects, each genuine user identifier is based on a combination of (i) a domain of an entity that created the user group identified by the genuine user group identifier and (ii) a unique identifier for the user group identified by the genuine user group identifier.

In some aspects, each genuine user group identifier is a message authentication code generated based on the combination of the domain and the unique identifier.

In some aspects, generating the probabilistic data structure based on the second set of group identifiers includes generating a hashed output for each user group identifier with a uniform distribution across all user group identifiers and generating the probabilistic data structure that includes the hashed output of each user group identifier in the second set of group identifiers.

In general, the user experience is improved when content platforms provide digital components or other content based on a user's group membership data. For example, a user can be added to a user group for a particular category in response to the user interacting with an electronic resource related to the category so that digital components related to that category are provided to the user. This information can be stored at the user's device to preserve the user's privacy with respect to group membership. Absent the availability of this information, a content platform has to evaluate digital components for user groups that do not include the user as a member. For example, a content platform may evaluate digital components for all of its user groups and provide digital components for at least some of these groups without knowing whether the user is actually a member of any of them. An application at the user's device can evaluate each received digital component to determine whether it is associated with a user group of which the user is a member and ignore digital components that do not have this association. To alleviate the wasted computational burden of evaluating digital components that are not related to user's group membership, the user's group membership could be provided to the content platforms. However, this membership data is typically private to the users and would enable content platforms to track users by using the membership data sent in each request as a fingerprint of the user.

The subject matter described in this specification can be implemented in particular embodiments so as to realize one or more of the following advantages. For multiple requests sent by a client device of a user, an application can modify a user's group membership list to add and remove user group identifiers such that the modified list that is provided to content platforms is different for multiple requests, thereby providing differential privacy that prevents the content platforms from tracking the user by using a same list as a fingerprint of the user. By providing data identifying the user groups that include the user as a member, a content platform that selects digital components for the user based on the user's group membership can conserve computational resources that would otherwise be wasted evaluating digital components for user groups that do not include the user as a member. The computational resources of the client device are also conserved by not also having to evaluate digital components for user groups that do not include the user as a member. By having the actual user group membership information available, with some added and subtracted user group identifiers for differential privacy, the search space for matching user group identifiers is much smaller, resulting in the computational savings at the content platform and fewer digital components being transmitted over a network and stored on a client device.

The data identifying user group identifiers for a user can be encoded in a probabilistic data structure, which preserves user privacy by not sharing the plaintext values of all of the user group identifiers for the user and results in a smaller data size. This smaller data size reduces the consumption of network bandwidth, increases transmission speed, reduces the computational resources needed to receive and process the data, and reduces the data storage requirements for storing the user group membership data. By configuring the parameters of the probabilistic data structure to have a small, e.g., 1%, false positive rate, the number of user groups that do not include the user as a member and that the content platforms evaluates is also small, resulting in computational savings at the content platform, at the client device, and reduces that amount of bandwidth consumed by sending digital components for user groups that do not include the user as a member. The systems and techniques described in this document enables digital components to be requested and distributed without identification of the requester, making the systems more secure. For example, this prevents the requesters from being targeted as their identity is not known.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document relates to preserving user privacy when analyzing user data for the purposes of improving user experience. This enables the sharing of confidential information to content platforms using differential privacy techniques which maintains the anonymity of the users, while reducing the computational burden that would otherwise be imposed on the platforms to evaluate digital components for user groups that do not include the user as a member.

Figure 1:
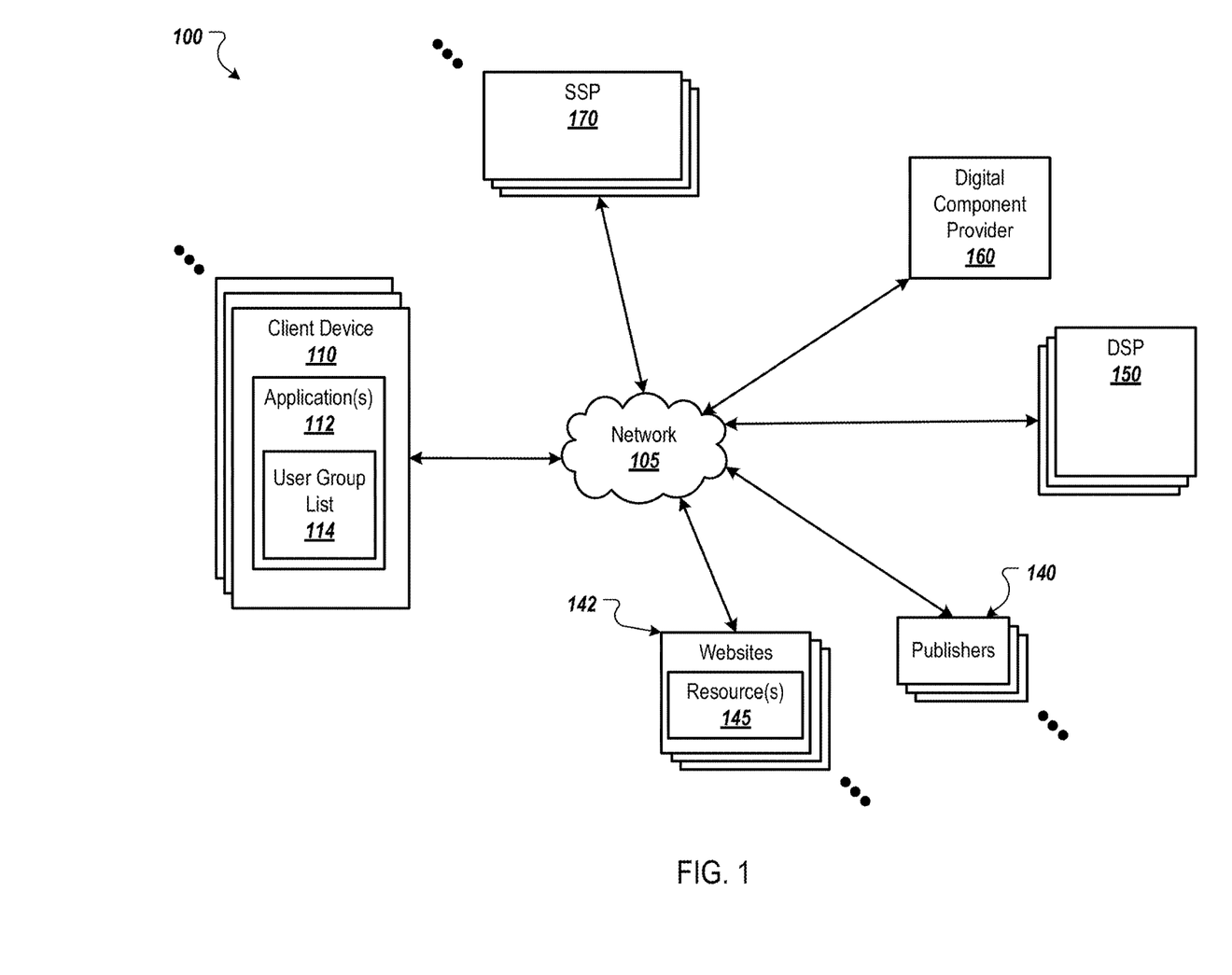
FIG. 1 is a block diagram of an environment in which content is distributed to client devices.

FIG. 1 is a block diagram of an environment 100 in which content is distributed to client devices 110. The example environment 100 includes a data communication network 105, such as a local area network (LAN), a wide area network (WAN), the Internet, a mobile network, or a combination thereof. The network 105 connects client devices 110, demand-side platforms (DSPs) 150, supply-side platforms (SSPs) 170, publishers 140, and websites 142. The example environment 100 may include many different client devices 110, DSPs 150, SSPs 170, publishers 140, and websites 142.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. A digital component slot can be a digital component tag embedded in the resource and that includes computer-readable code for requesting a digital component. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include codes (e.g., scripts) that cause the application 112 to request a digital component for presentation to a user of the client device 110.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. An SSP 170 can interact with one or more DSPs 150 to obtain information that can be used to select a digital component for a digital component slot. As described in more detail below, this information can include a selection parameter that represents an amount that a digital component provider 160 is willing to provide to the publisher 140 for presentation of a digital component of the digital component provider 160. Each publisher 140 can have a corresponding SSP 170 or multiple SSPs 170. Multiple publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple SSPs 170 on behalf of digital component providers 160 to provide digital components for presentation with the resources and/or applications of multiple different publishers 140. In general, a DSP 150 can receive requests for digital components (e.g., from an SSP 170 directly or by way of an exchange), generate (or select) a selection parameter for one or more digital components created by one or more digital component providers based on the request, and provide data related to the digital component (e.g., the digital component itself) and the selection parameter to an SSP 170.

In some cases, it is beneficial to a user to receive digital components related to web pages, application pages, or other electronic resources previously visited and/or interacted with by the user. In order to distribute such digital components to users, the users can be assigned to user groups when the users visit particular resources or perform particular actions at the resource (e.g., interact with a particular item presented on a web page or add the item to a virtual cart). For example, if the user of the device searches for shoes and visits multiple webpages of different shoe manufacturers, the browser can add the user to a user group such as "shoes" and store the corresponding user group identifier of the user group "shoes" on the client device. Thus, the user groups can represent interests of the users. The user groups can be generated by the digital component providers 160 and are identified by a user group identifier. That is, each digital component provider 160 can assign users to their user groups when the users visit electronic resources of the digital component providers 160. For example, if a user adds shoes to a shopping cart of an online retailer, the retailer can add the user to a shoes user group. A user can be assigned to multiple user groups for multiple different digital component providers.

To protect user privacy, a user's group membership can be maintained at the user's client device 110, e.g., by one of the applications 112, or the Operating System of the client device 110, rather than by a digital component provider 160, by a content platform, or by another party. In a particular example, an application 112 can maintain a list of user group identifiers ("user group list") 114 for a user. The user group list 114 can include a group identifier for each user group to which the user has been added. The digital component providers 160 that creates the user groups can specify the user group identifiers for their user groups. The user group identifier for a user group can be descriptive of the group (e.g., gardening group) or a code that represents the group (e.g., an alphanumeric sequence that is not descriptive). The user group list 114 for a user can be stored in secure storage at the client device 110 and/or can be encrypted when stored.

The user group identifiers to which a user is actually assigned are referred to as genuine group identifiers. In some implementations, each user group identifier is based on a combination of (i) a resource locator (e.g., a domain, URL, or the eTLD+1) of an entity (e.g., the digital component provider 160 or DSP 150) that created and/or manages the user group identified by the user group identifier and (ii) a unique identifier for the user group identified by the user group identifier. For example, a digital component provider may have a website at example.com and a user group for shoes with the identifier "shoes." In this example, the user group identifier used in the environment 100, e.g., by the application 112, the SSPs 170, and the DSPs 150 may be a combination of "example.com" and "shoes" or based on this combination.

As mentioned above, the resource locator for the entity can be the eTLD+1 for a domain of the entity that created or manages the user group. The eTLD+1 is the effective top-level domain (eTLD) plus one level more than the public suffix. An example eTLD+1 is "example.com" where ".com" is the top-level domain.

In an environment with multiple digital component providers 160, each digital component provider 160 can have access to, or maintain multiple user groups and each user can be a member of multiple user groups. For example, a clothing distributor can have user groups for each type of clothing and a user can be a member of one or more clothing groups of the clothing distributor and a gardening group of a home improvement organization. In some implementations, a hash function can be used to generate a hashed output for (i) a resource locator of an entity (e.g., the digital component provider) that created the user group and (ii) a unique identifier for the user group identified by the entity. The result of this hash function can be the user group identifier for the group used in the environment 100. In other examples, other information specific to the entity that created the user group can be used in place of the resource locator.

For example, assume "example.com" is the domain of the digital component provider and UG_ID is the unique group identifier for a particular user group identified by the digital component provider 160. The application 112 can use a cryptographic function to generate the user group identifier based on the resource locator and the unique group identifier. The function can be a pseudorandom function, such as a keyed-hash message authentication code (HMAC) implemented using Secure Hash Algorithm (SHA256) which is a cryptographic hash function with a digest length of 256 bits to generate a hashed 256 bit (32 byte) output. In such an example, HMAC (UG_ID, example.com) generates, as the user group identifier, a 256 bit unique identifier of the user group.

By using hash functions to determine the user group identifiers, without additional information, it is computationally impossible for recipients of the user group identifiers to find out the identity of the entity that created/manages the user group or the unique identifier for the user group. Thus, the hash function approach protects the entity's confidential information (e.g., the number of digital component campaigns started, stopped, ongoing, etc.) if another entity receives the user group identifiers for users. The hash function also preserves user privacy by preventing such entities from determining the user's complete group membership.

When the application 112 presents a resource or application content related to a digital component provider 160, or a web page on a website 142, the resource can request that the application 112 to add one or more user group identifiers to the user group list of the user. In response, the application 112 can add one or more user group identifiers to the user group list 114 and store the user group list securely. This is further explained with reference to FIG. 2.

To obtain digital components for presentation with electronic resources of a publisher 140, e.g., in digital component slots, the application 112 can submit a request to the SSP 170 for the publisher 140. This request can include the user group identifiers for the user, e.g., the user group identifiers included in the user group list 114. In some implementations, the application 112 can send the plaintext values of the user group identifiers. However, this would provide recipients of the list with the entire user group membership of the user and enables the recipients to track the user based on multiple requests for the user.

To preserve user privacy, the application 112 can apply noise, e.g., differential privacy noise, to the user group identifiers for the user before providing the user group identifiers to the SSP 170. As described below, this can include removing one or more of the genuine user group identifiers for user groups of which the user is actually a member. This can also include adding one or more fake user group identifiers that can either not represent any actual user groups (e.g., just a random identifier) or be an identifier for an actual user group of which the user is not a member. This preserves user privacy by preventing recipients from knowing the user's entire group membership data and, if the user group identifiers that are added to and removed from the list provided to the SSP 170 is different for different requests, can prevent recipients from tracking the user based on the user's group membership as the lists they receive will differ.

In addition, the application 112 can generate a probabilistic data structure, e.g., a Bloom filter or a cuckoo filter, based on the user group identifiers in the user group list 114. For example, the application 112 can generate the probabilistic data structure based on the list of user identifiers after differential privacy techniques are applied to the user group list 114. This preserves user privacy by preventing recipients from obtaining the user's entire group membership data and reduces the data size of the user group data, providing performance advantages, as described above.

Figure 3:
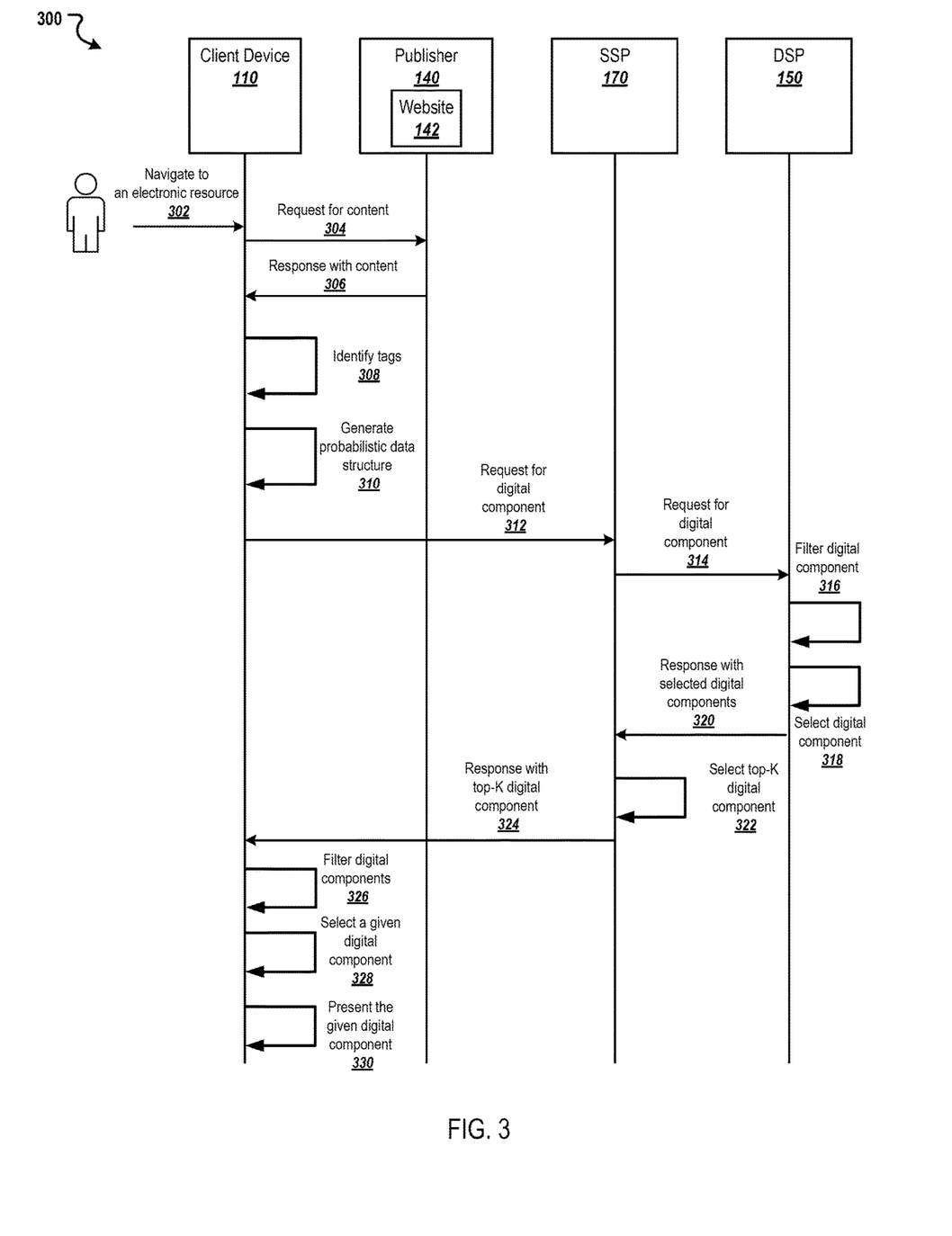
FIG. 3 is a swim lane diagram of an example process for requesting and receiving digital components based on user groups.

The SSP 170 can receive the request and submit requests to one or more DSPs 150. These requests sent to the DSPs 150 can also include the user group identifiers for the user. The DSPs 150 can select one or more digital components for the user based one or more user groups for the user and provide selection parameters for the digital component(s) to the SSP 170. The selection parameter that represents an amount that a digital component provider 160 is willing to provide to the publisher 140 for presentation of a digital component of the digital component provider 160. The SSP 170 can apply some exclusions on behalf of the publisher 140 and provide a list of digital components to the application 112 based on the selection parameters. The application 112 can select a digital component from the list and present the digital component with the electronic resource of the publisher 140. An example process for obtaining digital components is illustrated in FIG. 3 and described below.

In some implementations, an application 112 can provide a user interface that enables a user to manage the user groups to which the user is assigned. For example, the user interface can enable the user to remove user group identifiers, prevent all or particular resources 145, publishers 140, digital component providers 160, digital component exchanges, and/or DSPs 150 from adding the user to a user group (e.g., prevent the entity from adding user group identifiers to the list of user group identifiers maintained by the application 112). This provides better transparency and control for the user.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
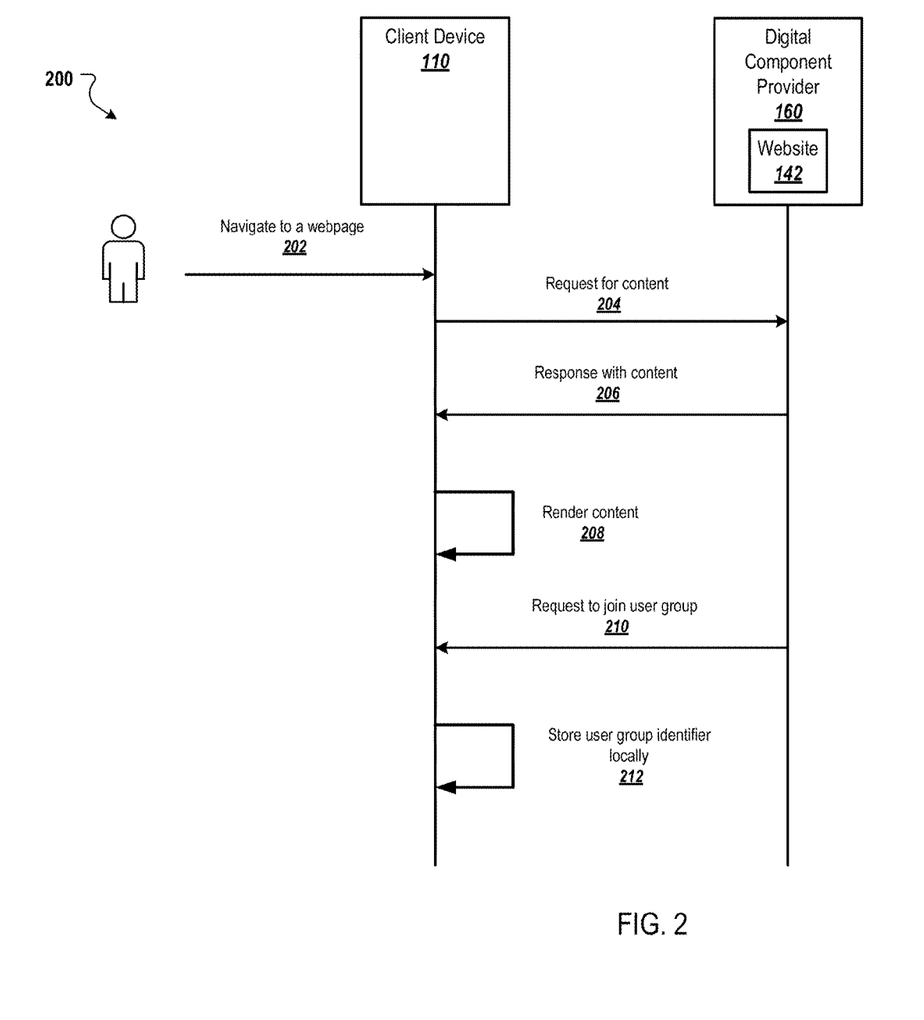
FIG. 2 is a swim lane diagram of an example process for associating a user to a user group.

FIG. 2 is a swim lane diagram that illustrates an example process 200 for adding one or more user group identifiers to the user group list 114 for a user. Operations of the process 200 can be implemented, for example, by the client device 110. Operations of the process 200 can also be implemented as instructions stored on one or more computer readable media which may be non-transitory, and execution of the instructions by one or more data processing apparatus can cause the one or more data processing apparatus to perform the operations of the process 200. Although this process 200 is described in terms of a web browser downloading a web page, a native application can be used in a similar process.

In this example, the user of the client device 110 uses an application 112 such as a web browser to access a website 142 of a digital component provider 160 hosted on a web server. To access the website 142, the client device 110 can initiate a request for the website 142, and the web server that hosts the website 142 can respond to the request by sending computer-executable instructions and/or data that initiate the presentation of a web page (or other electronic resource) at the client device 110.

The web page can include computer-executable code, e.g., scripts, that prompt the web browser of the client device 110 with a request to join a given user group, e.g., a user group that is related to the content of the web page, or the user's interaction with the webpage or website 142. For example, assume that the website 142 is an e-commerce website for shoes. After navigating to the website 142, the web page downloaded from the website 142 can prompt the user of the client device 110 with a request to join a user group "Shoes." The user interface of the web browser can further enable the user to respond to the prompt, and allow the user to either accept or reject the request to join a user group "Shoes." In a scenario when the user of the client device 110 accepts the request to join the user group, the web browser stores the corresponding user group identifier on the client device 110. In another example, the web browser can add the user to the user group without promoting the user, e.g., if the user enables such functionality. The example process 200 is further explained below.

In this example, a digital component provider 160 that provides digital components for presentation with other publisher's resources based on user group membership is also a publisher of a website. For example, the digital component provider 160 may have a website that includes content related to its products or services and also wants to present digital components related to its products or services on websites with other content, e.g., news websites.

The user of the client device 110 navigates to a website 142 (202) of a digital component provider 160. For example, user of the client device 110 can use a browser to visit a website 142 by specifying a reference (e.g., URL). In another example, the user of the client device 110 uses the web browser to submit a search query to the search system that identifies websites by crawling and indexing the websites (e.g., indexed based on the crawled content of the websites). In response, the search system identifies the websites in the form of search results and returns the search results to the client device 110 in the search results page. A search result is data generated by the search system that identifies a website that is responsive (e.g., relevant) to a particular search query, and includes an active link (e.g., hypertext link) that causes a client device 110 to request data from a specified location such as a web server, in response to user interaction with the search result. An example search result can include a website title, a snippet of text or a portion of an image extracted from the website, and the URL of the website. After viewing the search results, the user of the client device 110 can select and/or click the search result corresponding to the website 142.

The client device 110 generates a request for content for the website 142 and transmits the request over the network 105 to the web server (204). For example, after the user of client device 110 clicks and/or selects the search result corresponding to the website 142 or directly specifies the website 142 by using a reference (e.g., URL), the web browser running on the client device 110 generates a request for digital content (e.g., a web page of the website 142) and transmits it over the network 105 to the web server.

The request for digital content can be transmitted, for example, over a packetized network, and the content requests themselves can be formatted as packetized data having a header and payload data. The header can specify a destination of the packet and the payload data can include any of the information discussed above.

The web server responds with the content (e.g., web page) of the website 142 (206). For example, after receiving the request for digital content (i.e., the website 142) from the client device 110, the web server hosting the website 142 responds by transmitting machine executable instructions and that initiate presentation of the web page at the client device 110. The response can include data related to the web page that is transmitted, for example, over a packetized network, and the content themselves can be formatted as packetized data.

The client device 110 renders the content for presentation to the user (208). After receiving the digital content (e.g., the web page) from the web server, the web browser renders the content for presentation to the user. For example, the web browser can use the display of the client device 110 to present the web page to the user.

The digital component provider 160 requests the web browser of the client device 110 to add the user to a user group (210). For example, the digital component provider 160 (e.g., the web server of the digital component provider 160) after transmitting the computer-executable instructions that initiate presentation of data related to the website 142, can prompt the user of client device 110 to join a user group. In another example, the web page can include computer-executable code, e.g., scripts, that invoke an Application Programming Interface (API) of the web browser to request that the web browser add the user to the user group.

In some implementations, the user group is selected by the digital component provider 160 from among the multiple available user groups known and/or managed by the digital component provider 160. In the current example, the website 142 is an e-commerce website for purchasing shoes. The web server hosting the website 142 can prompt the user of the client device 110 with a request to join a user group "Shoes." The user interface of the web browser can further enable the user to respond to the prompt, and allow the user to either accept or reject the request to join a user group "Shoes."

In some implementations, the application 112 (e.g., web browser) may provide the user of the client device 110 with configurable options, such that the acceptance and rejection of user groups can be handled autonomously without the user's intervention. For example, the user of the client device 110 may configure certain options the application 112 such that the application 112 can automatically accept user groups when prompted by the publisher 140.

The user group identifier is stored on the client device 110 (212). As mentioned before, each user group is identified by a user group identifier that is determined by the publisher 140. After accepting the request to join a particular user group, the web browser stores the user group identifier corresponding to the particular user group on the client device 110. For example, if the user of the client device 110 accepts the request to join the user group "Shoes," after being prompted by the content provider, the web browser stores the user group identifier of the user group "Shoes" on the client device 110. As described above, the user group identifiers can be stored in secure storage at the client device 110.

In situations, when the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

FIG. 3 is a swim lane diagram that illustrates an example process 300 for requesting and receiving digital components. Operations of the process 300 can be implemented, for example, by the client device 110, an SSP 170, one or more DSPs 150, and a publisher 140. Operations of the process 300 can also be implemented as instructions stored on one or more computer readable media which may be non-transitory, and execution of the instructions by one or more data processing apparatus can cause the one or more data processing apparatus to perform the operations of the process 300.

In this example, the user of the client device 110 uses an application 112 such as a web browser or native application to access an electronic resource (e.g., web page or application page) that includes a digital component slot.

The application 112 after loading the web page that includes a digital component slot, sends a request for a digital component to the digital component provider based on one or more user groups to which the user of the client device 110 is assigned. In some implementations, the request for a digital component is sent to a supply side platform (SSP) 170 which is a hardware and/or software that automates the process of obtaining digital components for applications.

The request for a digital component includes a probabilistic data structure such as a Bloom filter or a Cuckoo filter, generated by the application 112, or the client device' Operating System, using the first set of user group identifiers that are stored in the client device 110. For example, the first set of user group identifiers can be the user group identifiers in the user group list 114 stored on the client device 110. In some implementations, the probabilistic data structure is based on a second set of group identifiers that is generated from the first set of the group identifiers by removing one or more genuine group identifiers from the first set of user group identifiers and by adding one or more fake group identifiers that are not among the first set of group identifiers. The probabilistic data structure can be based on a random hash function that generates a hashed output of each user group identifier such that the hashed output has a uniform distribution across all user group identifiers.

Upon receiving the request for a digital component, the SSP 170 can interact with one or more digital component providers and/or one or more DSPs 150 that are a type of technology platform implemented in hardware and/or software that automates the process of distributing digital components for presentation with the applications. In some implementations, the SSP 170 may transmit the probabilistic data structure to the DSP 150.

The DSP 150 selects one or more digital components from a set of available digital components, by filtering out digital components that do not have a corresponding user group identifier that matches one of the user group identifiers represented by the probabilistic data structure. In some implementations, the DSP 150 can generate a hashed output using the same hash function as the application 112 for each user group identifier related to each available digital component. In such implementation, the hashed output is searched within the probabilistic data structure and digital components that do not have the corresponding hashed value of the user group identifier are filtered from the selection process.

The DSP 150 can further select digital components (for e.g., top-N digital components) by analyzing and scoring each of the one or more selected digital components. The DSP 150 then transmits the selected digital components to the SSP. After receiving the selected digital components from the DSP 150, the SSP 170 can review and select a set of digital components (for e.g., top-K digital components) prior to enabling the digital components to be provided for presentation on the client device based on criteria and/or conditions set by the publisher 140. For example, the SSP 170 can review the content and format of a digital component to ensure that it meets various criteria, e.g., does not include particular types of content, meets data and/or display size requirements, etc. The set of digital components is sent to the application 112 executing on the client device 110.

The application 112 executing on the client device 110 after receiving the set of digital components can select a filtered subset of digital components by filtering out from the set of digital components, one or more digital components that do not have a corresponding user group identifier that matches one of the genuine user identifiers in the first set of user group identifiers, e.g., the user group identifies in the user group list 114. To filter out the one or more digital components from the set of digital components, the application 112 identifies one or more corresponding user group identifiers for each digital component in the set of digital components, e.g., in metadata for the digital components. After identification, the application 112 compares each user group identifier for each digital component to the genuine user group identifiers in the first set of user group identifiers to remove digital component that does not have a corresponding user group identifier that matches one of the genuine user group identifiers in the first set of user group identifiers.

Finally, the digital components in the filtered subset of digital components are analyzed to select the given digital component. After selection, the given digital component is presented on the client device (for e.g., rendered in the digital component slots).

The user of the client device 110 using the application 112 navigates to an electronic resource (302). For example, the user of the client device 110 can use a browser to visit a website 142 by specifying a reference (e.g., URL). In another example, the user of the client device 110 can use a web browser to submit a search query to the search system that identifies websites by crawling and indexing the websites (e.g., indexed based on the crawled content of the websites). In response, the search system identifies the websites in the form of search results and returns the search results to the client device 110 in the search results page. After viewing the search results, the user of the client device 110 can select and/or click the search result corresponding to the website 142. In yet another example, the user can launch a native application that requests content from a publisher 140 of the application.

The client device 110 generates a request for content and transmits the request over the network 105 to the web server (304). For example, after the user of client device 110 clicks and/or selects the search result corresponding to the website 142 or directly specifies the website 142 by using a reference (e.g., URL), the application 112, i.e. the web browser running on the client device 110 generates a request for digital content (i.e. the website 142) and transmits it over the network 105 to the web server.

The request for digital content can be transmitted, for example, over a packetized network 105, and the content requests themselves can be formatted as packetized data having a header and payload data. The header can specify a destination of the packet and the payload data can include any of the information discussed above.

The publisher 140, e.g., a web server or content server of the publisher 140, responds with the content (306). For example, after receiving the request for content (i.e. the request for the website 142) from the client device 110, a server can respond by transmitting computer-executable instructions and data that initiate presentation of a web page at the client device 110. The response can include data related to the web page that is transmitted, for example, over a packetized network 105, and the content themselves can be formatted as packetized data.

The client device 110 identifies tags for digital components in the electronic resource (308). After receiving the electronic resource or content for the electronic resource from the publisher 140, the application 112 can identify the one or more tags, e.g., one or more tags for digital component slots of the electronic resource. For example, a web browser can identify one or more digital component slots in a web page.

The client device 110 generates a probabilistic data structure (310). As mentioned before, the probabilistic data structure can be based on a second set of group identifiers that is generated from the first set of the group identifiers by randomly (or pseudorandomly) removing genuine group identifiers from the first set of user group identifiers and by randomly (or pseudorandomly) adding fake group identifiers that are not among the genuine user group identifiers of the first set of user group identifiers. The probabilistic data structure is based on a random hash function that generates a hashed output of each user group identifier such that the hashed output has a uniform distribution across all user group identifiers. Example probabilistic data structures include Bloom filters and Cuckoo filters. An example process for generating a probabilistic data structure is described below with reference to FIG. 4.

The client device 110 transmits a request for digital components to the SSP 170 (312). The client device 110 can send the request to a computing system of the SSP 170, which may also be referred to as a recipient computing system. For example, the application 112 can generate one or more requests for digital components based on the one or more digital component slots. In a particular example, a web browser can generate a request for digital components based on the tags and transmit the request to the SSP 170 over the network 105.

In some implementations, the request for digital components may include the probabilistic data structure generated by the client device 110 (explained with reference to FIG. 4). For example, the web browser application 112 generates a request for a digital component that includes the probabilistic data structure. The probabilistic data structure represents a second set of user group identifiers that is based on the user group identifiers in the user group list 114 to which the user of the client device 110 is associated, and transmits the request for digital components to the SSP 170.

In some implementations, the request for digital components can also include additional data, such as contextual data. The contextual data can include, for example, a resource locator for the resource, e.g., a Universal Resource Locator (URL) for a web page or Universal Resource Identifier (URI) for application content, a language (e.g., the language in which content is presented by the application rendering the content) and/or coarse geographic location information indicating a coarse location of the client device 110.

The request for digital components can be transmitted, for example, over a packetized network 105, and the component requests themselves can be formatted as packetized data having a header and payload data. The header can specify a destination of the packet and the payload data can include any of the information discussed above.

The SSP 170 transmits a request for digital components to one or more DSPs 150 (314). As mentioned before, the digital component providers 160 can use one or more DSPs 150 to automate the process of distributing digital components for presentation with the applications. After receiving the request, the SSP 170 can interact with one or more DSPs and transmit a corresponding request for digital components that includes the probabilistic data structure and optionally the contextual data.

The DSP 150 filters digital components based on the probabilistic data structure (316). In some implementations, the DSP 150 selects one or more digital components from a set of digital components by filtering out digital components that do not have a corresponding user group identifier that matches one of the user group identifiers in the probabilistic data structure. In such implementations, the DSP 150 can generate a hashed output using the same hash function as the client device 110 for each user group identifier known to the DSP 150. In such implementation, the DSP 150 can search the hashed output within the probabilistic data structure for each user group identifier known or managed by the DSP 150. The DSP 150 can filter, from a set of candidate digital components for providing in response to the request, each digital component that does not have a corresponding user group identifier for which its hashed output is not found in the probabilistic data structure. For example, at least a portion of the digital components distributed by the DSP 150 can have one or more user group identifiers for user groups related to the digital component. In a particular example, a digital component with content about a particular pair of shoes may have, as corresponding user group identifiers, identifiers for a "Shoes" group, a "Clothing" group, and "Footwear" group.

Such implementation can take advantage of the false positive rate of the probabilistic data structure. As used throughout this document, the phrase "false positive rate" refers to a value that identifies the expected rate or number of false positives associated with a probabilistic data structure. The false positive rate may be, for example, a function of the algorithms and parameters selected for the probabilistic data structure and the size of the probabilistic data structure. Thus, these parameters can be adjusted to adjust the false positive rate.

For example, assume that the probabilistic data structure is a Bloom filter with a false positive rate of 1%. Also assume that the DSP 150 is aware of and manages the provisioning of digital components for one million user groups. Also assume that the user is a member of ten of these user groups. Such a false positive rate can shrink the pool of all user group identifiers known to the DSP 150 to about 1% of the user group identifiers, resulting in a corresponding reduction in the number of candidate digital components left in the selection process after the filtering. For example, there could be ten thousand false positive user group identifiers and ten true positive user group identifiers. This can result in better computational performance for the DSP 150 and a faster response time that improves the user experience as the DSP 150 does not have to waste time and computational resources evaluating the digital components for one million user groups.

The DSP 150 selects one or more digital components after filtering out digital components based on the probabilistic data structure (318). In some implementations, the DSP 150 can further select digital components (for e.g., top-N digital components) by analyzing and scoring each of the one or more selected digital components. This scoring can be, for example, based on the contextual data, expected performance of the digital components, and/or additional information.

The DSP 150 transmits data for the one or more selected digital components to the SSP 170 (320). For example, the DSP 150 can respond to the request for digital components of the SSP 170 by transmitting the one or more selected digital components or data identifying the digital components (e.g., creative elements that include instructions for presenting the digital components). For each digital component, the DSP 150 can also generate or select a selection parameter for the digital component. The DSP 150 can then transmit, to the SSP 170, the selection parameter and data for the digital component. Each digital component (or its data) can include additional data, e.g., metadata that indicates the user group identifier corresponding to the digital component.

In some implementations, the DSP 150 can also select one or more digital components based on the contextual data independent of the probabilistic data structure and therefore independent of the user's group membership. These digital components can also be referred to as contextual digital components.

The SSP 170 selects a set of digital components (322). For example, after receiving the data for the one or more selected digital components from the DSP 150, the SSP 170 can review and select a set of digital components (for e.g., top-K digital components). For example, the SSP 170 can review the content and format of a digital component to ensure that it meets various criteria, e.g., does not include particular types of content, meets data and/or display size requirements, etc.

In some implementations, the SSP 170 selects the digital components based at least in part on the selection parameters received from the DSPs 150. In such implementations, the SSP 170 can select the digital components having the highest selection parameters among the selection parameters received from the DSP 150.

The SSP 170 transmits a set of digital components to the client device 110 (324). For example, the SSP 170 after selecting the set of digital components (for e.g., top-K digital components), transmits the set of digital components (or the data for the digital components) to the application 112 executing on the client device 110 over the network 105. In some implementations, the SSP 170 may transmit along with the set of digital components, a set of selection parameters.

In some implementations, the list of digital components transmitted by the SSP 170 can be ordered based on the selection parameters. This enables the application 112 to select a digital component without knowing the actual selection parameters. The list of digital components can also include, for each digital component, data indicating the user group identifiers corresponding to the digital component. This enables the application 112 to filter out digital components for user groups of which the user is not a member.

In some implementations, this list includes the digital components selected based on the probabilistic data structure and at least one contextual digital component. In a particular implementation, the list can include the digital components selected based on the probabilistic data structure in order based on selection parameters, e.g., from highest to lowest, and one contextual digital component (e.g., the one having the highest selection parameter among all contextual digital components received from the DSPs 150) at the end of the list. In this way, if none of the digital components selected based on the probabilistic data structure have user group identifiers that match the genuine user group identifiers of the user, the contextual digital component can be selected and presented by the application 112.

The application 112 running on the client device 110 selects a filtered subset of digital components (326). The application 112 executing on the client device after receiving the set of digital components from the SSP 170, can select a filtered subset of digital components by filtering out from the set of digital components, one or more digital components that do not have a corresponding user group identifier that matches one of the genuine user identifiers in the first set of user group identifiers. For example, to filter out one or more digital components from the set of digital components, the application 112 compares each of the user group identifiers for the digital components to the genuine user group identifiers of the user, e.g., in the user group list 114 stored at the client device 110.

For each digital component, the application 112 can compare the one or more user group identifiers for the digital component to the genuine user group identifiers for the user. If none of the user group identifiers match, the application 112 can filter the digital component from the set of digital components. If at least one user group identifier matches, the application 112 can keep the digital component in the set of digital components. This filtering can lead to the identification of one or more digital components in the set of digital components that do not have a corresponding user group identifier that matches one of the genuine user group identifiers. The filtered subset of digital components is then generated by the application 112 by removing the identified one or more digital components from the set of digital components.

The client device 110 selects a given digital component from the filtered subset of digital components (328). In some implementations, the application 112 can select based on the selection parameters, a given digital component for presentation in the digital component slots. For example, the website 142 has one digital component slot. The selection process may include selecting a digital component that has the highest selection parameter. In some implementations, the application 112 can select the given digital component based on user preference that are not shared. For example, the user of the web browser application 112 can provide to the application 112 a user curated list of topics. In such a situation, the application 112 selects the given digital component based on a combination of selection parameters and the topics in the curated list. In some implementations, when an ordered list is used, the application 112 selects the top remaining digital component that survived filtering in the list.

The application 112 presents the given digital component (330). For example, application 112 can present the given digital component with the electronic resource of the publisher 140.

Figure 4:
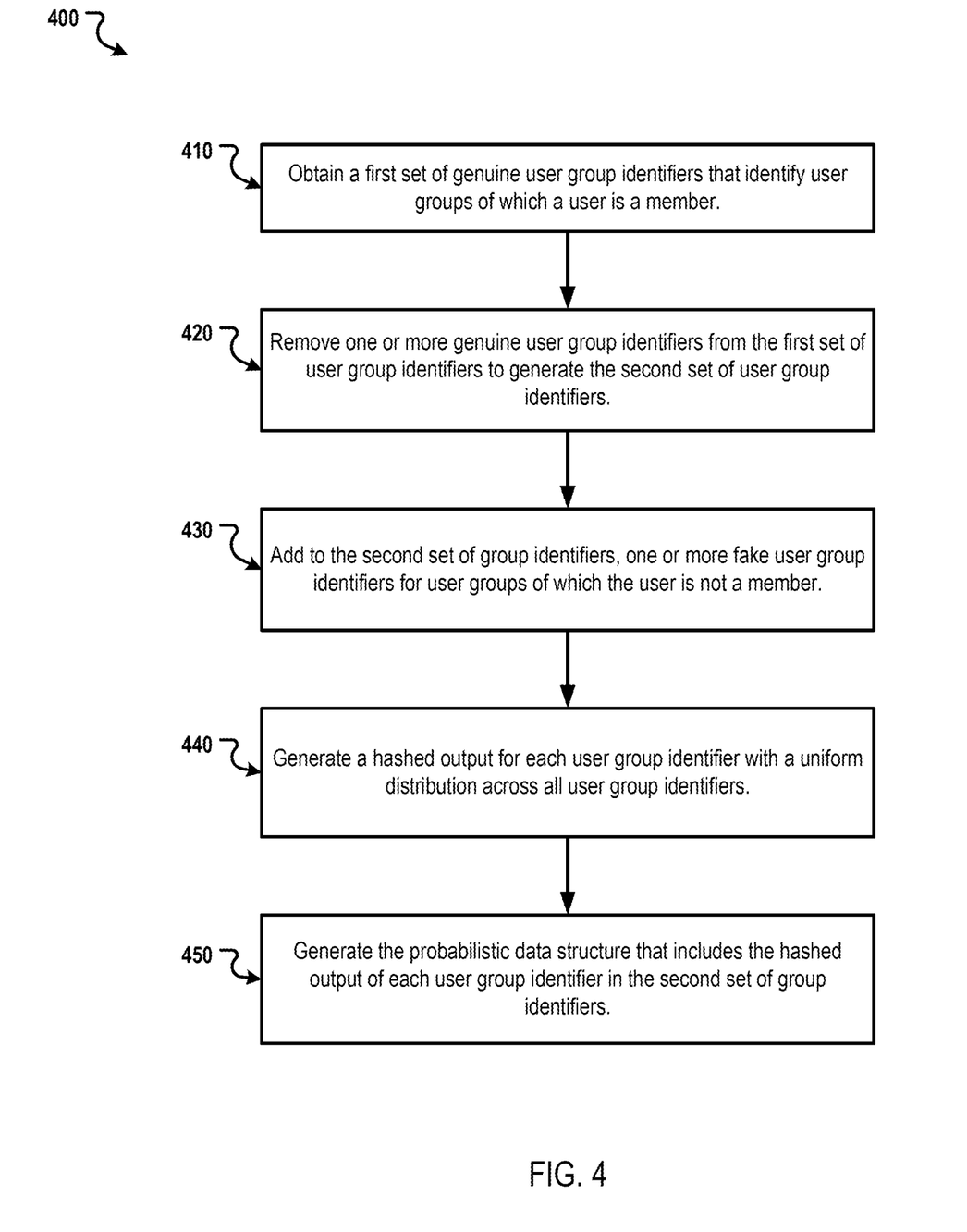
FIG. 4 is a flow diagram illustrating the example process of generating a probabilistic data structure.

FIG. 4 is a flow diagram illustrating the process 400 of generating the probabilistic data structure based on the one or more user groups to which the user of the client device is associated. Operations of the process 400 can be implemented, for example, by the client device 110. Operations of the process 400 can also be implemented as instructions stored on one or more computer readable media which may be non-transitory, and execution of the instructions by one or more data processing apparatus can cause the one or more data processing apparatus to perform the operations of the process 400.

A first set of genuine user group identifiers that identify user groups of which a user is a member is obtained (410). As mentioned before with reference to FIG. 2, the user of the client device 110 can be associated to one or more user groups. In other words, the user of the client device 110 can be a member of one or more user groups. Each user group is identified by a user group identifier that is stored on the client device 110 to maintain the privacy of the user. For example, the application 112, such as a web browser can maintain a user group list 114 that includes the one or more user group identifiers and store it on the client device. These one or more user group identifiers form the first set of genuine user group identifiers of which the user is actually a member.

Zero or more genuine user group identifiers are removed from the first set of user group identifiers to generate a second set of user group identifiers (420). In some implementations, the application selects one or more of the genuine user group identifiers randomly or pseudo-randomly to be removed from the first set of user group identifiers. For example, assume that the user group list 114 maintained by the application 112 includes five user group identifiers S1, S2, S3, S4 and S5. Also assume that S2 and S5 are randomly selected and removed. In such a scenario, the second set of user group identifiers includes S1, S3 and S4. In some implementations, the application 112 may not remove any genuine user group identifiers, e.g., depending on the target privacy level.

One or more fake user group identifiers for user groups of which the user is not a member are added to the second set of user group identifiers (430). In some implementations, the application 112 selects one or more fake user groups randomly or pseudo-randomly to add to the second set of user group identifiers. The fake user group identifiers are for user groups of which the user is not a member. For example, assume that the selected two or more fake user group identifiers include S23 and S27 and that the user is not a member of the groups corresponding to these user group identifiers. In such a scenario, the second set of user group identifiers will include S1, S3, S4, S23 and S27.

In some implementations, the fake user group identifiers do not actually represent a user group at all. For example, the application 112 would likely not be aware of every user group managed by the DSPs 150. Rather than select from user groups managed that the user is not a member of, the application 112 can generate a fake user group identifier, which may just be a random alphanumeric sequence. By adding and removing user group identifiers in this way, the application 112 can achieve differential privacy for each user.

A hashed output is generated for each user group identifier in the second set of user group identifiers (440). The hash can be generated such that the hashed outputs have a uniform distribution across all user group identifiers. As mentioned before, a hash function can be used to generate a hashed output for each user group identifier in the second set of user group identifiers. For example, the application 112 uses a keyed-hash message authentication code (HMAC) implemented using Secure Hash Algorithm (SHA256) which is a cryptographic hash function with a digest length of 256 bits to generate a hashed 256 bit (32 byte) output of each user group identifier in the second set of user group identifiers.

The probabilistic data structure that includes the hashed output of each user group identifier in the second set of group identifiers is generated (450). In some implementations, a probabilistic data structure such as a Bloom filter or a Cuckoo filter is used to generate a spatially efficient data structure that can be used to transmit information regarding the user group identifiers from the client device 110 to the SSPs 170. For example, assume that the user group list 114 maintained by the application 112 includes 200 user group identifiers. The size of the hashed output for a single user group identifier using HMAC-SHA256 will be 256 bits. In such a case the total size of the hashed output of all 200 user group identifiers in the user group list 114 will be 51,200 bits (i.e., 6.4 kB). When using a Bloom filter with a 1% false positive probability, each user group identifier can be represented by less than 10 bits. In such a case, the 200 user group identifiers in the user group list 114 can be represented using 2000 bits (i.e. 250 bytes).

In some implementations, the application 112 generates a new probabilistic data structure for each request for digital components sent by the application 112. In this way, the data structure is different for each request based on the randomly or pseudo-randomly added and removed user group identifiers. This prevents the DSPs 150 from tracking users based on user group membership. As a DSP's 150 user group identifiers may be removed in some cases, by varying the probabilistic data structure, it is likely that the DSP's 150 user group identifier will be represented in at least one the probabilistic data structures. In some implementations, the application 112 generates a new probabilistic data structure for each domain visited by the application 112 but uses the same probabilistic data structure for multiple requests from the same domain.

Figure 5:
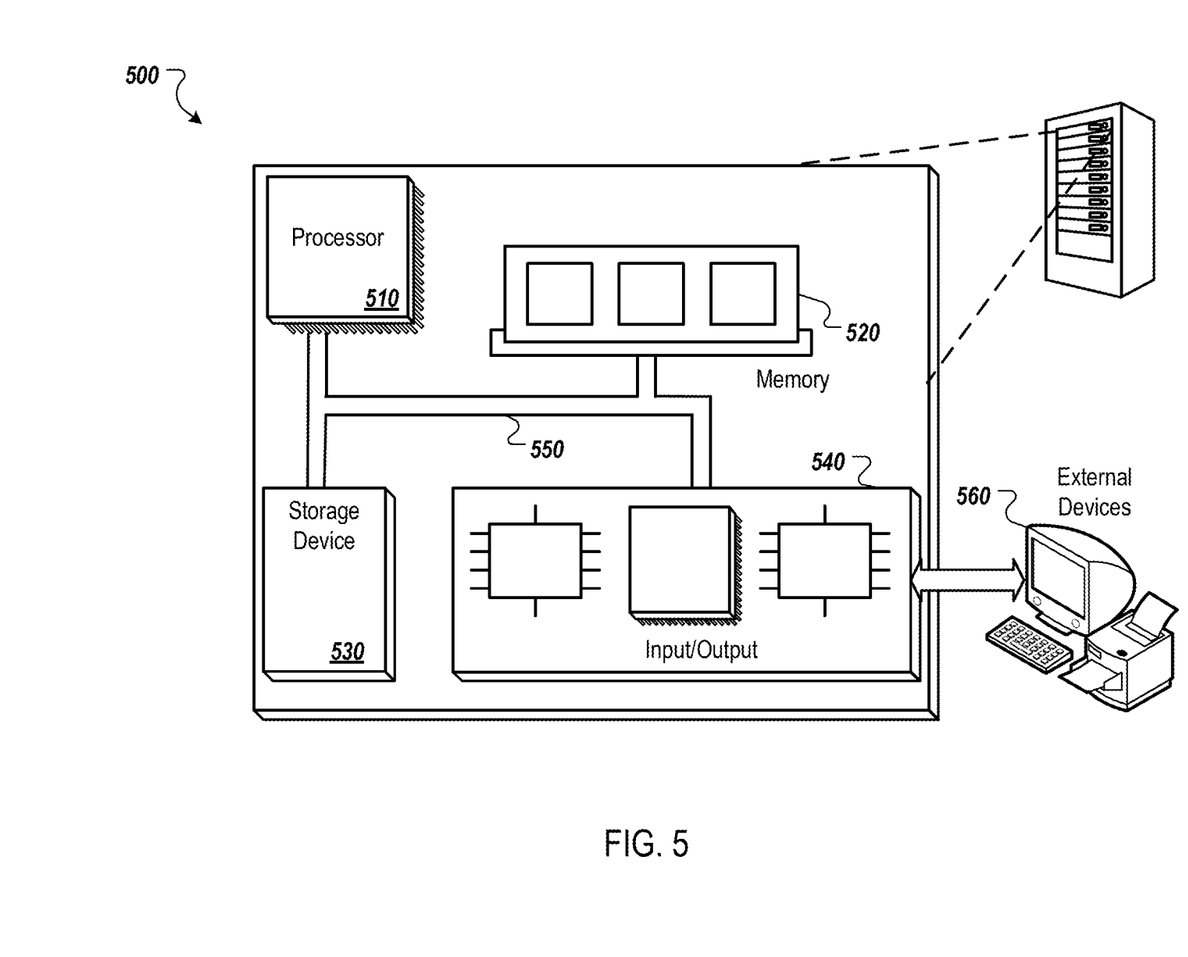
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining a first set of genuine user group identifiers that identify user groups that include a user as a member;
   generating, based on the first set of genuine user group identifiers, a second set of user group identifiers for the user, the generating comprising:
      removing zero or more genuine user group identifiers from the first set of user group identifiers to generate the second set of user group identifiers; and
      adding, to the second set of user group identifiers, one or more fake user group identifiers for user groups that do not include the user as a member;
   generating a probabilistic data structure based on the second set of user group identifiers;
   transmitting the probabilistic data structure to a recipient computing system;
   receiving data indicating a set of digital components comprising at least one digital component selected based on the probabilistic data structure;
   selecting a given digital component from the set of digital components, including:
      generating a filtered subset of digital components, by filtering, from the set of digital components, one or more digital components that do not have a corresponding user group identifier that matches one of the genuine user identifiers; and
      selecting the given digital component from the filtered subset of digital components; and
   presenting the given digital component.

2. The computer-implemented method of claim 1, wherein removing zero or more genuine user group identifiers from the first set of user group identifiers comprises removing a plurality of genuine user group identifiers from the first set of user group identifiers.

3. The computer-implemented method of claim 2, wherein the set of digital components comprises one or more additional digital components that are not selected based on the probabilistic data structure.

4. The computer-implemented method of claim 1, wherein filtering, from the set of digital components, one or more digital components that do not have a corresponding user group identifier that matches one of the genuine user group identifiers comprises:
   for each digital component in the set of digital components:
      identifying, in the data indicating the set of digital components, one or more corresponding user group identifiers for the digital component, each corresponding user identifier being a user group identifier used to select the digital component for inclusion in the set of digital components; and
      comparing each corresponding user identifier to the genuine user group identifiers in the first set of user group identifiers; and removing, from the set of digital components, each digital component that does not have a corresponding user group identifier that matches one of the genuine user group identifiers in the first set of user group identifiers.

5. The computer-implemented method of claim 1, wherein:
the data indicating the set of digital components comprises data identifying first digital components that each have one or more corresponding user group identifiers and data identifying one or more second digital components that do not have any corresponding user group identifiers; and
selecting a given digital component from the set of digital components comprises removing, from the set of digital components, each first digital component for which none of the corresponding user group identifiers for the first digital component matches a genuine user group identifier.

6. The computer-implemented method of claim 5, wherein selecting a given digital component from the set of digital components comprises selecting a second digital component when all of the first digital components are removed from the set of digital components.

7. The computer-implemented method of claim 1, wherein the recipient computing system selects a subset of user groups from a plurality of user groups based on the probabilistic data structure and selects the set of digital components corresponding to the subset of user groups.

8. The computer-implemented method of claim 1, wherein the probabilistic data structure comprises a Bloom filter or a cuckoo filter.

9. The computer-implemented method of claim 1, wherein each genuine user identifier is based on a combination of (i) a domain of an entity that created the user group identified by the genuine user group identifier and (ii) a unique identifier for the user group identified by the genuine user group identifier.

10. The computer-implemented method of claim 9, wherein each genuine user group identifier is a message authentication code generated based on the combination of the domain and the unique identifier.

11. The computer-implemented method of claim 1, wherein generating the probabilistic data structure based on the second set of group identifiers comprises:
generating a hashed output for each user group identifier with a uniform distribution across all user group identifiers; and
generating the probabilistic data structure that includes the hashed output of each user group identifier in the second set of group identifiers.

12. A computer-implemented method, comprising:
obtaining a first set of genuine user group identifiers that identify user groups that include a user as a member;
generating, based on the first set of genuine user group identifiers, a second set of user group identifiers for the user, the generating comprising:
removing one or more genuine user group identifiers from the first set of user group identifiers to generate the second set of user group identifiers, wherein removing the one or more genuine user group identifiers from the first set of user group identifiers comprises selecting the one or more genuine user group identifiers randomly or pseudo-randomly; and
adding, to the second set of user group identifiers, one or more fake user group identifiers for user groups that do not include the user as a member, wherein adding, to the second set of group identifiers, one or more fake user group identifiers comprises selecting the one or more fake user group identifiers randomly or pseudo-randomly;
generating a probabilistic data structure based on the second set of user group identifiers;
transmitting the probabilistic data structure to a recipient computing system;
receiving data indicating a set of digital components comprising at least one digital component selected based on the probabilistic data structure;
selecting a given digital component from the set of digital components; and
presenting the given digital component.

13. A system comprising:
one or more processors; and
one or more storage devices storing instructions that, when executed by the one or more processors, cause the one or more processors to perform operations comprising:
obtaining a first set of genuine user group identifiers that identify user groups that include a user as a member;
generating, based on the first set of genuine user group identifiers, a second set of user group identifiers for the user, the generating comprising:
removing zero or more genuine user group identifiers from the first set of user group identifiers to generate the second set of user group identifiers; and
adding, to the second set of user group identifiers, one or more fake user group identifiers for user groups that do not include the user as a member;
generating a probabilistic data structure based on the second set of user group identifiers;
transmitting the probabilistic data structure to a recipient computing system;
receiving data indicating a set of digital components comprising at least one digital component selected based on the probabilistic data structure;
selecting a given digital component from the set of digital components, including:
generating a filtered subset of digital components, by filtering, from the set of digital components, one or more digital components that do not have a corresponding user group identifier that matches one of the genuine user identifiers; and
selecting the given digital component from the filtered subset of digital components; and
presenting the given digital component.

14. The system of claim 13, wherein removing zero or more genuine user group identifiers from the first set of user group identifiers comprises removing a plurality of genuine user group identifiers from the first set of user group identifiers.

15. The system of claim 14, wherein the set of digital components comprises one or more additional digital components that are not selected based on the probabilistic data structure.

16. The system of claim 13, wherein filtering, from the set of digital components, one or more digital components that do not have a corresponding user group identifier that matches one of the genuine user group identifiers comprises:
for each digital component in the set of digital components:
identifying, in the data indicating the set of digital components, one or more corresponding user group identifiers for the digital component, each corresponding user identifier being a user group identifier used to select the digital component for inclusion in the set of digital components; and comparing each corresponding user identifier to the genuine user group identifiers in the first set of user group identifiers; and removing, from the set of digital components, each digital component that does not have a corresponding user group identifier that matches one of the genuine user group identifiers in the first set of user group identifiers.

17. The system of claim 13, wherein:

the data indicating the set of digital components comprises data identifying first digital components that each have one or more corresponding user group identifiers and data identifying one or more second digital components that do not have any corresponding user group identifiers; and selecting a given digital component from the set of digital components comprises removing, from the set of digital components, each first digital component for which none of the corresponding user group identifiers for the first digital component matches a genuine user group identifier.

18. A non-transitory computer storage medium encoded with instructions that, when executed by one or more computers, cause the one or more computers to perform operations comprising:

obtaining a first set of genuine user group identifiers that identify user groups that include a user as a member;

generating, based on the first set of genuine user group identifiers, a second set of user group identifiers for the user, the generating comprising:

removing zero or more genuine user group identifiers from the first set of user group identifiers to generate the second set of user group identifiers; and adding, to the second set of user group identifiers, one or more fake user group identifiers for user groups that do not include the user as a member;

generating a probabilistic data structure based on the second set of user group identifiers;

transmitting the probabilistic data structure to a recipient computing system;

receiving data indicating a set of digital components comprising at least one digital component selected based on the probabilistic data structure;

selecting a given digital component from the set of digital components, including:

generating a filtered subset of digital components, by filtering, from the set of digital components, one or more digital components that do not have a corresponding user group identifier that matches one of the genuine user identifiers; and selecting the given digital component from the filtered subset of digital components; and presenting the given digital component.

19. A system comprising:

one or more processors; and one or more storage devices storing instructions that, when executed by the one or more processors, cause the one or more processors to perform operations comprising:

obtaining a first set of genuine user group identifiers that identify user groups that include a user as a member;

generating, based on the first set of genuine user group identifiers, a second set of user group identifiers for the user, the generating comprising:

removing one or more genuine user group identifiers from the first set of user group identifiers to generate the second set of user group identifiers, wherein removing the one or more genuine user group identifiers from the first set of user group identifiers comprises selecting the one or more genuine user group identifiers randomly or pseudo-randomly; and adding, to the second set of user group identifiers, one or more fake user group identifiers for user groups that do not include the user as a member, wherein adding, to the second set of group identifiers, one or more fake user group identifiers comprises selecting the one or more fake user group identifiers randomly or pseudo-randomly;

generating a probabilistic data structure based on the second set of user group identifiers;

transmitting the probabilistic data structure to a recipient computing system;

receiving data indicating a set of digital components comprising at least one digital component selected based on the probabilistic data structure;

selecting a given digital component from the set of digital components; and presenting the given digital component.

* * * * *